C. NEWMAN.
POT FOR MELTING GLASS.
No. 64,558.                              Patented May 7, 1867.
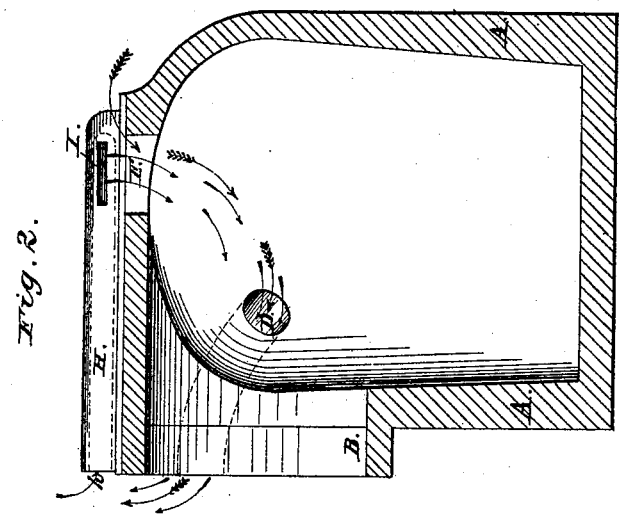
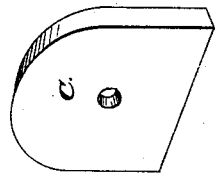
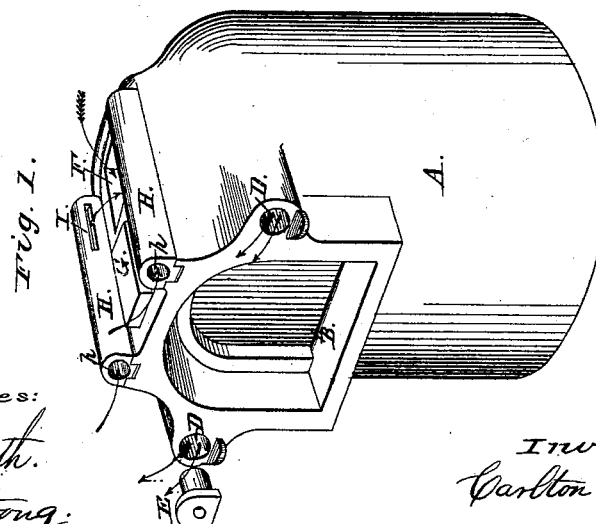
Witnesses:
Cyrm Smith.
Geo. W. Strong.
Inventor.
Carlton Newman.

United States Patent Office.

CARLTON NEWMAN, OF SAN FRANCISCO, CALIFORNIA.

Letters Patent No. 64,558, dated May 7, 1867.

---

IMPROVED POT FOR MELTING GLASS.

---

The Schedule referred to in these Letters Patent and making part of the same.

---

TO ALL WHOM IT MAY CONCERN:

Be it known that I, CARLTON NEWMAN, of San Francisco city, San Francisco county, State of California, have invented certain new and useful improvements in "Pots for Melting Glass;" and I do hereby declare the following description and accompanying drawings are sufficient to enable any person skilled in the art or science to which it most nearly appertains to make and use my said invention without further invention or experiment.

The nature of my invention is to provide a pot for melting glass, which combines the qualities of a covered pot for making superior glass with those of an open pot for making the inferior qualities quickly.

This pot is more especially intended to be used in a flint-glass furnace, where covered pots are employed. One or more covered pots, and one or more of my open pots, can be used at the same time in the furnace without interfering with each other; the object being to make the common qualities of glass, such as green, black, and German flint, much quicker than it can be done in the covered pots where the heat penetrates through the pot, and to make a fine quality of glass in the covered pot. For this purpose I construct a pot like the ordinary covered pot, with an opening in front. In the top of this pot, or at some point above the "metal mark" or surface of the glass, I make one or more openings to allow the flame and heat of the furnace to enter the pot. One or more flues are formed, of any desirable shape, but opening into the pot above the metal mark, and connecting with the stack to make a draught and carry off the products of the combustion. In order to furnish oxygen for a more perfect combustion and greater heat within the pot, I construct two flues extending from the front of the furnace to the opening which admits the heat to the pot. These flues conduct air from the outside, which becomes heated in passing through them, and enters the pot with the flame of the furnace.

To more fully describe my invention, reference is had to the accompanying drawings and the letters marked thereon, in which—

Figure 1 is a perspective view.

Figure 2, a side sectional elevation, showing the discharge flues.

A represents the body of the pot, constructed of the ordinary materials, and shaped like the covered pots used in flint-glass furnaces. B is an opening or mouth, through which the pot is charged, and from which the molten glass is taken as it is needed. C is a stopper or door to close this opening while the contents are being melted. On the top of this pot an opening, F, is made, through which the flame and heat of the furnace pass to the interior of the pot, as shown by the black arrows. D D are two flues formed in the sides of the pot, and opening into it above the metal mark, as shown in fig. 2. Their other ends connect with flues, which lead to the stack, shown in fig. 1, so that all the heat must pass through the pot to them before escaping up the stack or chimney. H H are two flues, the mouth of which, h, admits air from the outside of the furnace. These flues pass back as far as the opening F, where they are pierced by the openings I I. The air is thoroughly heated before it reaches these openings, and passes into the pot, as shown by the red arrows, thus supplying fresh oxygen to the unburned particles of carbon as they enter the pot, and increasing the heat within it. The air going through the tubes can be graduated at will by placing plugs in the outside openings. The smoke of the furnace has a tendency to give the glass a green color, but by furnishing more oxygen the combustion is rendered more perfect, and the heat within the pot more intense. If the glass should become "high colored" or have an excess of manganese after melting, by leaving the flues open for a little while it will burn out the color and leave the glass in working order. In close-covered pots, the fluxes which are used, if of an inferior quality, cause an accumulation of salt water on the surface of the glass, which must be skimmed off before working, in which operation much glass is lost; but in my pots the heat is so great as to vaporize this salt, and the draught carries it up the chimney, thus leaving a clean surface when ready for work. When the glass is made and in working order, the opening F is closed, and the flues D D also, by the doors or covers G and E. The stopper or door C is then removed and the glass allowed to settle, after which the work of blowing commences. If the glass should be too hot, by opening one or both of the flues D D the cold air would be drawn in through B, over the glass, and out through D D, cooling the glass in a few minutes.

Some of the advantages of my pot are, that it is an open pot while melting, and a covered pot while blowing. It can be used in a furnace where flint-glass or covered pots are employed, and will make glass much sooner than in a covered pot, so that the ordinary or common qualities of glass can be made as cheaply as in open pots. As the products of combustion must all pass through the pot before reaching the stack, and are more thoroughly consumed, the amount of fuel used to make a given quantity of glass is not as much as in furnaces where the ordinary pots are employed. Also on account of the action of the heat and draught through the pot on the salts, a cheaper flux may be used. By closing all the openings in the pot it will be like any covered pot, and can be used as such in the usual manner. If the opening F only is used, a great advantage will be gained over covered pots.

Having thus described my invention, what I claim, and desire to secure by Letters Patent, is—

1. A pot A, constructed with the opening F, and flues D D, or their equivalents, substantially as and for the purposes described.

2. The flues H H, or their equivalents, constructed and arranged substantially as and for the purpose described.

In witness whereof I have hereunto set my hand and seal.

CARLTON NEWMAN. [L. S.]

Witnesses:
   C. W. M. SMITH,
   GEO. H. STRONG.